United States Patent [19]

Chopping et al.

[11] Patent Number: 5,091,902
[45] Date of Patent: Feb. 25, 1992

[54] TELECOMMUNICATIONS TRANSMISSION SECURITY ARRANGEMENT

[75] Inventors: Geoffrey Chopping, Dorset; Jonathan W. Rowe, Nottingham, both of England

[73] Assignee: GEC Plessy Telecommunications Limited, Coventry, England

[21] Appl. No.: 529,686

[22] Filed: May 24, 1990

Related U.S. Application Data

[63] Continuation of Ser. No. 336,159, Apr. 11, 1989, abandoned.

[30] Foreign Application Priority Data

Aug. 16, 1988 [GB] United Kingdom ............... 8819470

[51] Int. Cl.$^5$ ........................... H04J 3/14; H04Q 3/00
[52] U.S. Cl. ................................. 370/16.1; 370/16; 370/85.15; 340/825.01; 340/825.05; 371/8.1
[58] Field of Search ........................ 370/16, 53, 54, 55, 370/80, 85.12, 85.13, 85.14, 85.15, 13, 13.1, 14, 16.1; 340/825.01, 825.05, 827, 825.06, 825.16, 825.17; 371/8.1, 8.2, 11.1, 11.2, 15.1, 20.1, 20.6, 68.1, 68.2; 455/8.9, 14, 15, 60; 380/33; 379/95

[56] References Cited

U.S. PATENT DOCUMENTS

| | | | |
|---|---|---|---|
| 3,866,121 | 2/1975 | Nakamura et al. ............... | 455/8 |
| 4,076,961 | 2/1978 | Holsinger et al. ............... | 455/8 |
| 4,347,605 | 8/1982 | Hashizume et al. .............. | 370/16 |
| 4,385,392 | 5/1983 | Angell et al. ................ | 340/825.01 |
| 4,573,044 | 2/1986 | McConachie et al. ......... | 340/825.05 |
| 4,633,246 | 12/1986 | Jones et al. .................. | 370/16 |
| 4,648,088 | 3/1987 | Cagle et al. .................. | 370/88 |
| 4,680,771 | 7/1987 | Ikeuchi et al. ................ | 370/16 |
| 4,694,492 | 9/1987 | Wirstrom et al. .............. | 379/95 |
| 4,696,060 | 9/1987 | Oswald .......................... | 370/16 |
| 4,771,423 | 9/1988 | Ohya et al. .................. | 340/825.05 |

Primary Examiner—Douglas W. Olms
Assistant Examiner—Alpus H. Hsu
Attorney, Agent, or Firm—Fleit, Jacobson, Cohn, Price, Holman & Stern

[57] ABSTRACT

The telecommunications transmission security arrangement comprises first and second transmission paths, each having first and second serially connected circuit means. The first circuit means of said first path is arranged to be connectable to the second circuit means of said second path. The first circuit means of the second path is arranged to be connectable to the second circuit means of the first path, and the second circuit means of each path are arranged to monitor alarm conditions of the transmission paths and set up a transmission path by way of the first circuit means of the first path and the second circuit means of the second path when the first path is determined not suitable for transmission. A transmission path is set up by way of the first circuit means of the second path and the second circuit means of the first path when the second path is determined not suitable for transmission.

1 Claim, 4 Drawing Sheets

TELECOMMUNICATIONS TRANSMISSION SECURITY ARRANGEMENT

This application is a continuation of application Ser. No. 07/336,159, filed Apr. 11, 1989, now abandoned.

FIELD OF THE INVENTION

The present invention relates to a telecommunications transmission security arrangement.

The present invention finds application in the field of digital telephony which use digital telephone exchange equipment such as System X in the network.

DESCRIPTION OF THE PRIOR ART

With the introduction of optical fibres into the telecommunications network it becomes necessary to terminate 10 Mbits/s systems on the digital switches in the exchanges. Although the architecture of existing switches is suitable for directly terminating systems such as high order transmission interfaces, the security of the transmission interface was based on individual 2048 kbit/s links.

Simple protection switching can be achieved by launching data streams along two parallel interfaces and choosing the better one at the receiving end. This technique may be used by both switching and transmission, however a problem arises in that the junctions between them are unsecured 2048 kbits/s interfaces.

SUMMARY OF THE INVENTION

The present invention overcomes this problem by providing protection switching in the form of a 'Scissors Crossover', where 16 by 2048 kbit/s streams from each of two switching planes are distributed to a pair of multi digital line termination units which are connected to the transmission interface of a duplicate 34,368 kbit/s inter-exchange transmission link. Similarly the input multi digital line termination devices interface to both switching planes.

The present invention has the advantage that since the existing switch architecture carries 16 by 2048 kbit/s speech links, corresponding to a 34368 kbit/s transmission link, then a fully protected transmission arrangement can be built from few functional units, and several similar configurations are possible for different carrier rate transmission systems. A further advantages is that the pairs received into the exchange network can be operated with asynchronous gapped clocks which will result in considerable saving of equipment. This is because many phase locked loops, line coding transformers, clock recovery circuits, etc can be eliminated and the remainder provided by logic performed by digital integrated circuits, because of the smoothing effect of aligners (or retimers).

STATEMENT OF THE OBJECT OF THE INVENTION

According to the present invention there is povided a telecommunications transmission security arrangement comprising first and second transmission paths, each path having first and second serially connected circuit means said first circuit means of said first path being arranged to be connectable to said second circuit means of said second path, and, said first circuit means of said second path being arranged to be connectable to said second circuit means of said first path, the second circuit means of each path are arranged to monitor alarm conditions of the transmission paths and set up a transmission path by way of the first circuit means of the first path and the second circuit means of the second path when the first path is determined not suitable for transmission, and, to set up a transmission path by way of the first circuit means of the second path and the second circuit means of the first path when the second path is determined not suitable for transmission.

BRIEF DESCRIPTION OF DRAWINGS

Embodiments of the invention will now be described with reference to the accompanying drawings in which.

DESCRIPTION OF THE PREFERRED EMBODIMENTS

Figure 1:
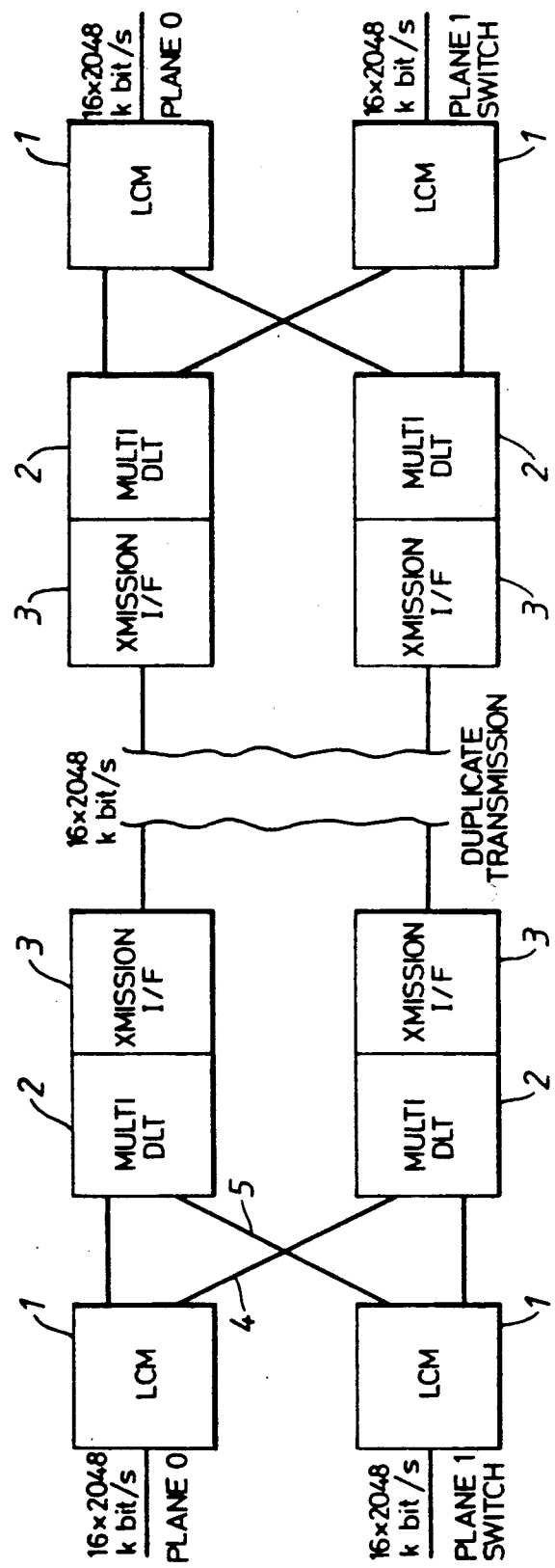
FIG. 1 shows a block diagram of a transmission system incorporating scissors-crossover protection switching.

Referring to FIG. 1, a duplicated transmission system is shown comprising a first plane, PLANE 0 and a second plane, PLANE 1. each carrying 16×2048 kbit/s.

Each plane at each end of the transmission line includes a line control multiplexer, 1 connected to a multi digital line termination unit, 2 which is interfaced to the transmission line by transmission interface equipment 3. The multi digital line termination unit 2 and the line control multiplexer 1, are used to provide the scissors crossover protection by use of paths 4,5. Selection of an A or B switch plane is made by the multi-digital line termination unit 2.

In the environment of System X, the digital line termination units constantly monitor line alarm conditions, such as input loss, loss of frame alignment, high error rate, and all 1's condition.

A subsystem known as the digital switching subsystem controls the digital line termination units. It receives the monitored alarm conditions and decides when a path is becoming unacceptable for transmission and instructs the respective digital line termination unit to switch to the standby route. An article by A. S. Philip, entitled The System X Digital Switching Subsystem (DSS), Systems Technology No 32, Sept. 1979 at page 5 describes the digital switching subsystem in detail, and discusses digital line termination units.

The line control multiplexer distributes clock, synchronised 2 Mbit speech data and control sync signals. It basically provides a number of fanout circuits.

Figure 2:
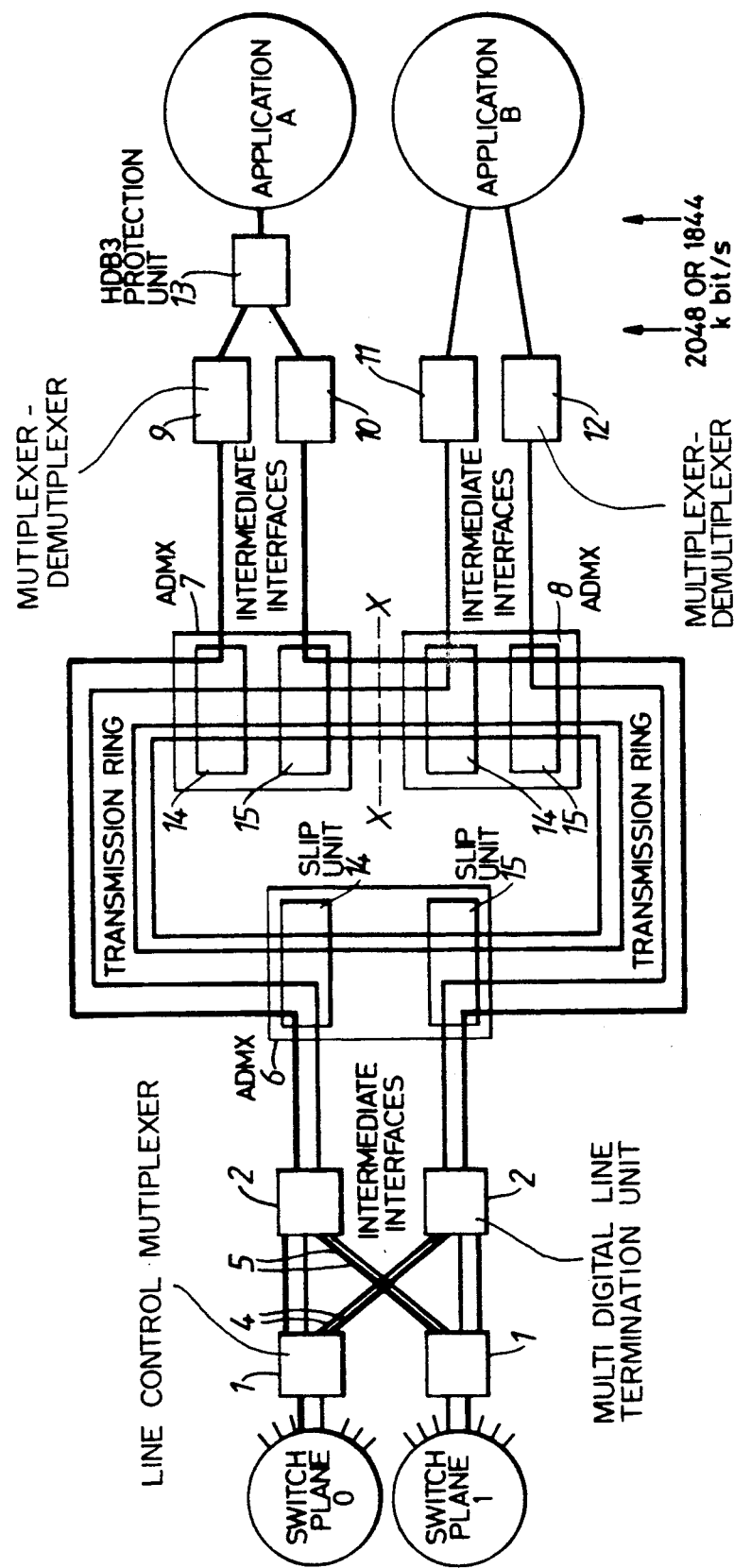
FIG. 2 shows a block diagram of a transmission ring incorporating scissors-crossover protection switching.

Referring to FIG. 2, the scissors crossover principle can be used in transmission rings to take advantage of the case of tributary configuration. FIG. 2 shows two configurations superimposed and configured as a ring. The scissors crossover is shown as paths, 4,5 between the line control multiplexers 1 and the multi digital line termination units 2.

If the ring is broken at X then application A is still connected to the main switch via the upper route, while application B is still connected via the lower route. It is very important to be able to select protection at the tributary level.

At each attachment point to the ring it is necessary to have an Add and Drop Multiplexer, 6-8 because only some of the tributaries are terminated at any attachment point.

The Add and Drop Multiplexer (ADMX) 6 has to be connected to the scissors crossover function. The add and Drop Multiplexer is arranged to add and drop the required tributaries and pass these tributaries via the Intermediate Interface to the scissors crossover function main switch.

Where ordinary type 2048/1544 kbits/s interfaces are required then the scissors crossover function is replaced by tributary multiplexer/demultiplexers 9-12. There are two arrangements shown in FIG. 2, (A) where an unsecured tributary interface is required and protection has to be done external to the application by unit 13 and (B), where the application contains the protection switching function. A more detailed arrangement of the tributary interface is shown in FIG. 3.

Figure 3:
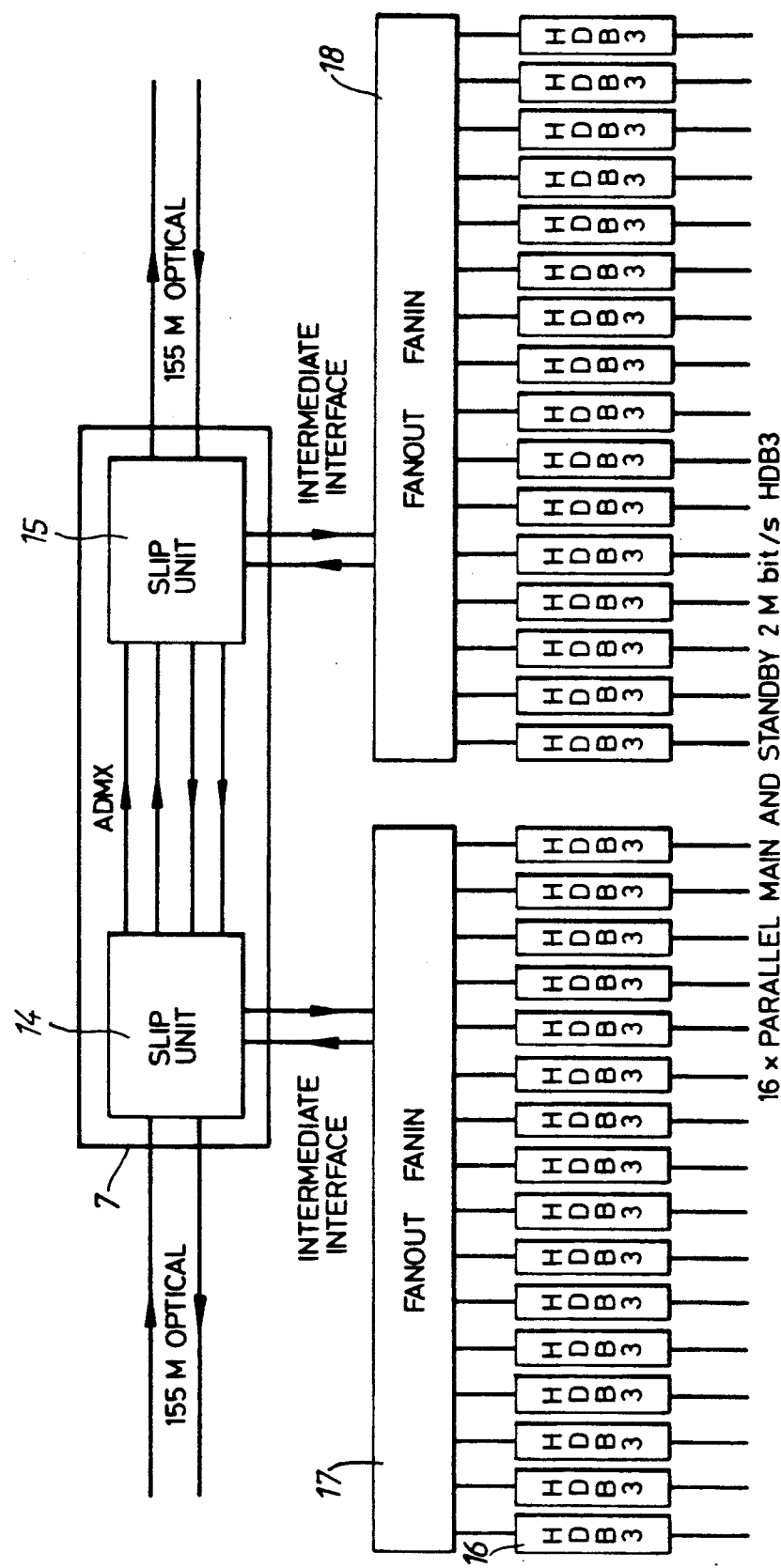
FIG. 3 shows a block diagram of a protected switch function contained in Application A of FIG. 2.

In FIG. 3, the ADMX 7 corresponds to that shown as 7 in FIG. 2, for example, and the fanout/fanin circuits 17,18 and the HDB3 circuits 16, correspond to the tributary multiplexer/demultiplexer circuits 9,10 and 13 of FIG. 2, for example. Some applications can be attached to the Intermediate Interfaces without the need for the low bit rate interfaces.

DIVISION OF CONTROL FUNCTIONS

The division of control between the ring and the attached applications, including the main switch, can be very conveniently drawn at the Intermediate Interface. The ring control looks after the connection of a pair of tributaries between the applications. The receiving application, whether using conventional protection switching or a scissors crossover, decides which of the pair of tributaries is the worker and which is the standby. The slip units of the ADMX will independently use the transport fault detection mechanisms to decide the best clock to use and alarm any area not performing to standard. Alarms are reported around the ring to the Master ADMX. The Master ADMX is usually the one which receives the Network Clock.

Each slip unit of an ADMX is able to extract control messages carried by the transport overhead of both counter rotating ring transmission systems, from the Master ADMX. These messages, if validated, are used to change the column interchange switch selections and other administration functions.

THE ADD AND DROP MULTIPLEXER (ADMX)

The security timing and switching of the ADMX, 6-8 will now be described in detail. The bit rate of the ring is assumed to be 155.52 Mbit/s although the principles will equally apply to higher or lower multiple bit rates.

Each ADMX consist of two identical "Slip Units", 14,15 as shown in FIG. 2. Traffic is slipped to and from the upper 155.52 Mbit/s Synchronous Stream by Slip Unit, 14 and traffic is slipped to and from the lower 155 Mbit/s Synchronous Stream by Slip Unit, 15.

Figure 4:
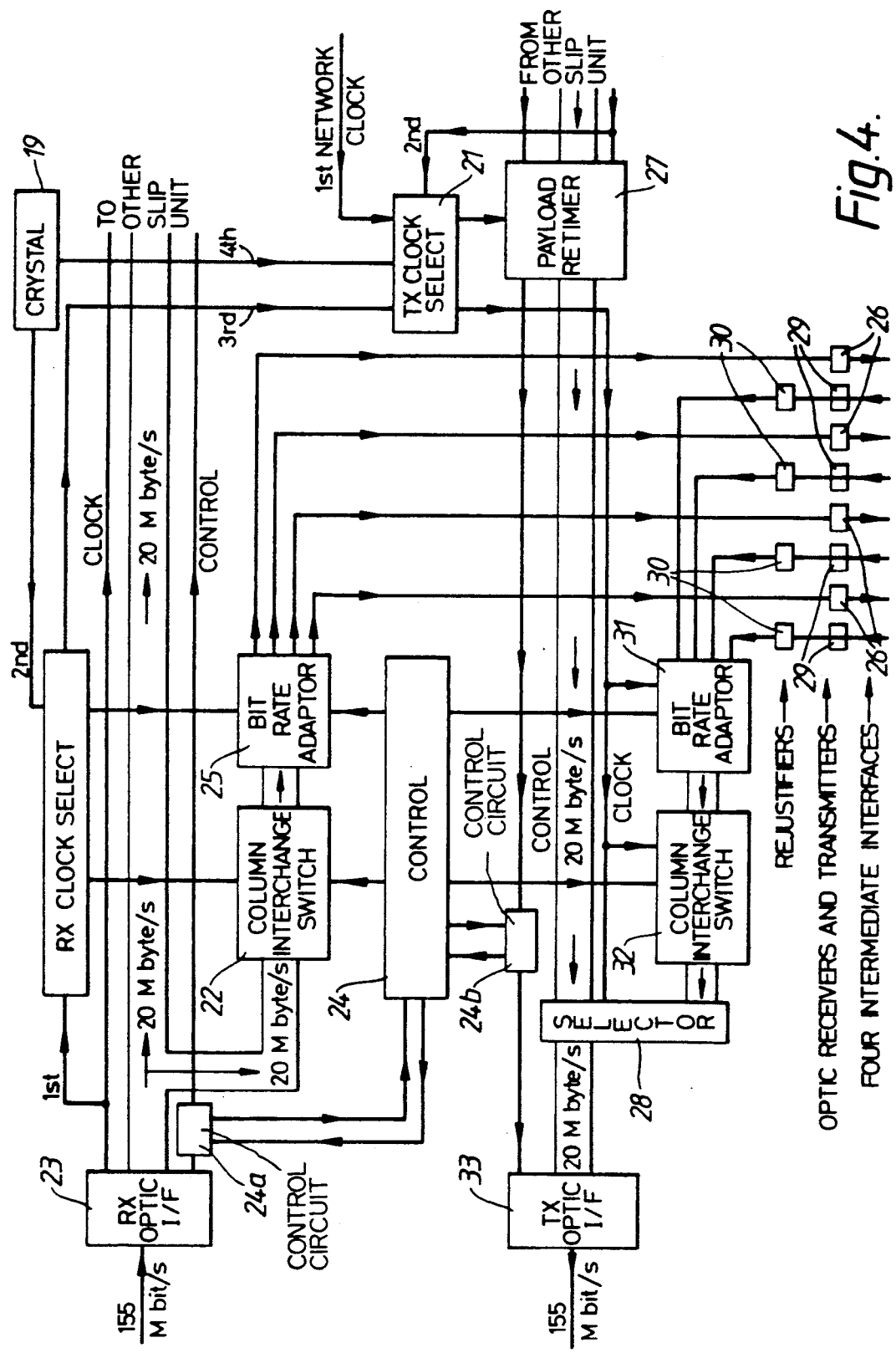
FIG. 4 shows a block diagram of a slip unit.

The ADMX is able to have a multiplicity of Intermediate Interfaces. The number will depend on the total amount of bandwidth to be attached, and the number of separate equipments of lower order multiplexers that must be attached. The general arrangement for one slip unit (half an ADMX) is shown in FIG. 4.

CLOCK SELECTION

A pair of slip units, usually the pair attached to the switch in the exchange, are supplied with a network clock which they use for their respective transmission interfaces. These clocks are transmitted around the ring in opposite directions. At the other pairs of slip units around the ring, the clock received by one slip unit to a pair is normally used by the other one of that pair to transmit around the ring. The same clock is also divided and used for the Intermediate Interface. Under fault conditions, when a slip unit cannot use its transmit normal clock it will use it own received clock, or if that is suspect then its standby crystal, 19.

Receive clock selection is made by circuit, 20, and the transmit clock selection by circuit 21.

At the receiving end of an Intermediate Interface there is a rejustifier, 30. This transfers the payload from the timing reference of the transmitting end to the timing reference of the receiving end.

Rejustification is used where no critical data loss is permissible. The input or output stream, or both, contain additional data in addition to the critical data. The additional data is used to fill up the data stream to the standard size and to indicate what data is critical data and what is additional data.

A slip unit must rejustify all its received Intermediate Interfaces to the ring timing used by its 155.52 Mbit/s transmit interface.

An ADMX has to rejustify between slip unit pairs which are supplied by the network clock. In practice all pairs have to rejustify in order to simplify the return from a standby clock after a fault. This rejustification is a complete payload rejustification.

COLUMN SWITCHING WITHIN THE ADMX

A slip unit is required to take any combination of tributaries, from the 155 Mbit/s ring interface, and pass the tributaries in a defined order to an Intermediate Interface, provided that the total bandwidth of the tributaries is within the bandwidth capability of the Intermediate Interface. A tributary is carried by several 9 byte columns. The column interchange switch function 22,32, must maintain sequence integrity, so that tributaries are accurately reassembled on the other side of the switch.

The advantage of having a tributary switching function within the ADMX is to minimise the number of tributary interfaces that have to be provided and still offer a very flexible arrangement. In order to allow for a multiplicity of Intermediate Interfaces, the rate adaption function is required to group the tributaries into several lower speed byte streams. This is a straight forward function as the column interchange switch, 22,32 puts the tributaries into a convenient order for grouping.

The 155.52 Mbit/s signals are received by an optical interface 23 and passed to the other slip unit of the ADMX. Clock information is extracted by circuit 20 and control information by the control circuits 24,24a.

Data is processed by the column interchange switch 22, bit rate adapter 25, and is outputted to the intermediate interfaces by optic transmitters 26.

Clock, control and data information is received from the other slip unit in the ADMX and processed by a payload retimer 27. The data and clock information is passed to a selector circuit 28, and the control information is passed to control circuit 24b. Incoming data from the intermediate interfaces is received by optic transmitters 29 and is processed by rejustifier circuits 30, bit rate adaptor circuit 31 and the column interchange switch 32 before being presented to the selector circuit 28. The bit rate adaptor circuit 31 and column interchange switch 32 are controlled by control circuit 24. The selector circuit 28, passes the selected data to the transmit optic interface 33 which is controlled by circuit 24b.

The invention is not intended to be limited to the embodiments described above. The invention can be applied to any two plane switching arrangement where security is required. For example, the invention could be used in an automatic digital distribution frame where electrical or optical links can be reconfigured at the distribution frame automatically, with security being provided by the scissors crossover technique at each switching stage of the automatic distribution frame. Also, different transmission rates than those disclosed could also be used.

We claim:

1. A telecommunications transmission security arrangement connected to a dual path ring transmission system wherein transmission in one path occurs in a direction opposite to transmission in the other path comprising first and second transmission paths, each path having first and second serially connected circuit means, said first circuit means of said first path being arranged to be connectable to said second circuit means of said second path, and said first circuit means of said second path being arranged to be connectable to said second circuit means of said first path, each second circuit means is arranged to constantly monitor alarm conditions of the transmission paths and based upon an alarm condition monitored by said second circuit means, the second circuit means are arranged to select a transmission path by way of the first circuit means of the first path and the second circuit means of the second path when the first path is determined not suitable for transmission by the second circuit means, and to set up a transmission path by way of the first circuit means of the second path and the second circuit means of the first path when the second path is determined not suitable for transmission, by the second circuit means, because of a monitored alarm condition, and wherein connection to the ring system is made by way of two add/drop multiplexers, a first of which is arranged to transfer traffic to and from an upper transmission rate synchronous stream and the second of which is arranged to transfer traffic to and from a lower transmission rate synchronous stream, each add/drop multiplexer including a switching arrangement which transfers a number of tributaries from the ring system in a defined order.

* * * * *